Feb. 27, 1962 E. C. ROEPKE 3,022,755
PARTICLE SELECTING AND DISPENSING DEVICE
Filed March 2, 1959 2 Sheets-Sheet 1
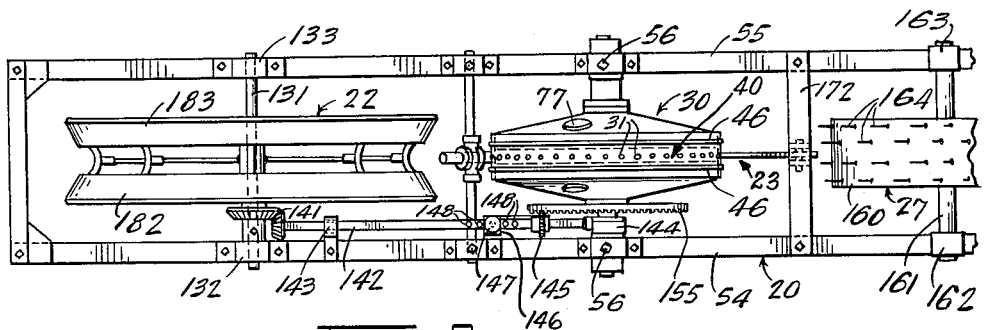
FIG-2-
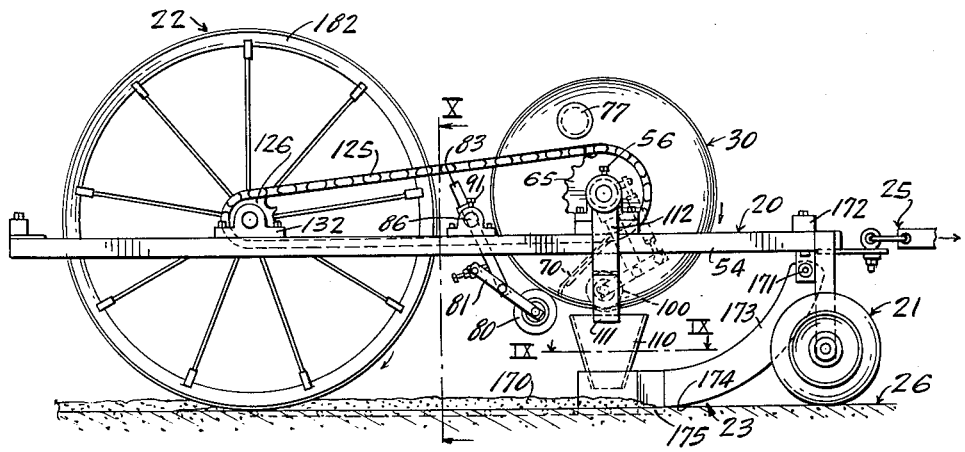
FIG-1-
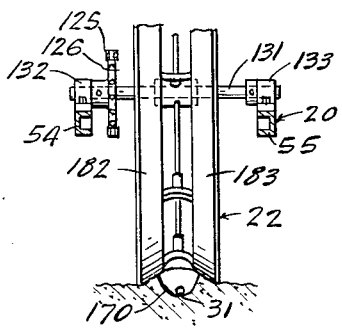
FIG-10-
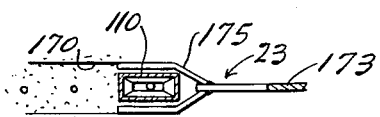
FIG-9-
INVENTOR:
EDWARD C. ROEPKE.
BY
Hugh A Kirk
ATTY.

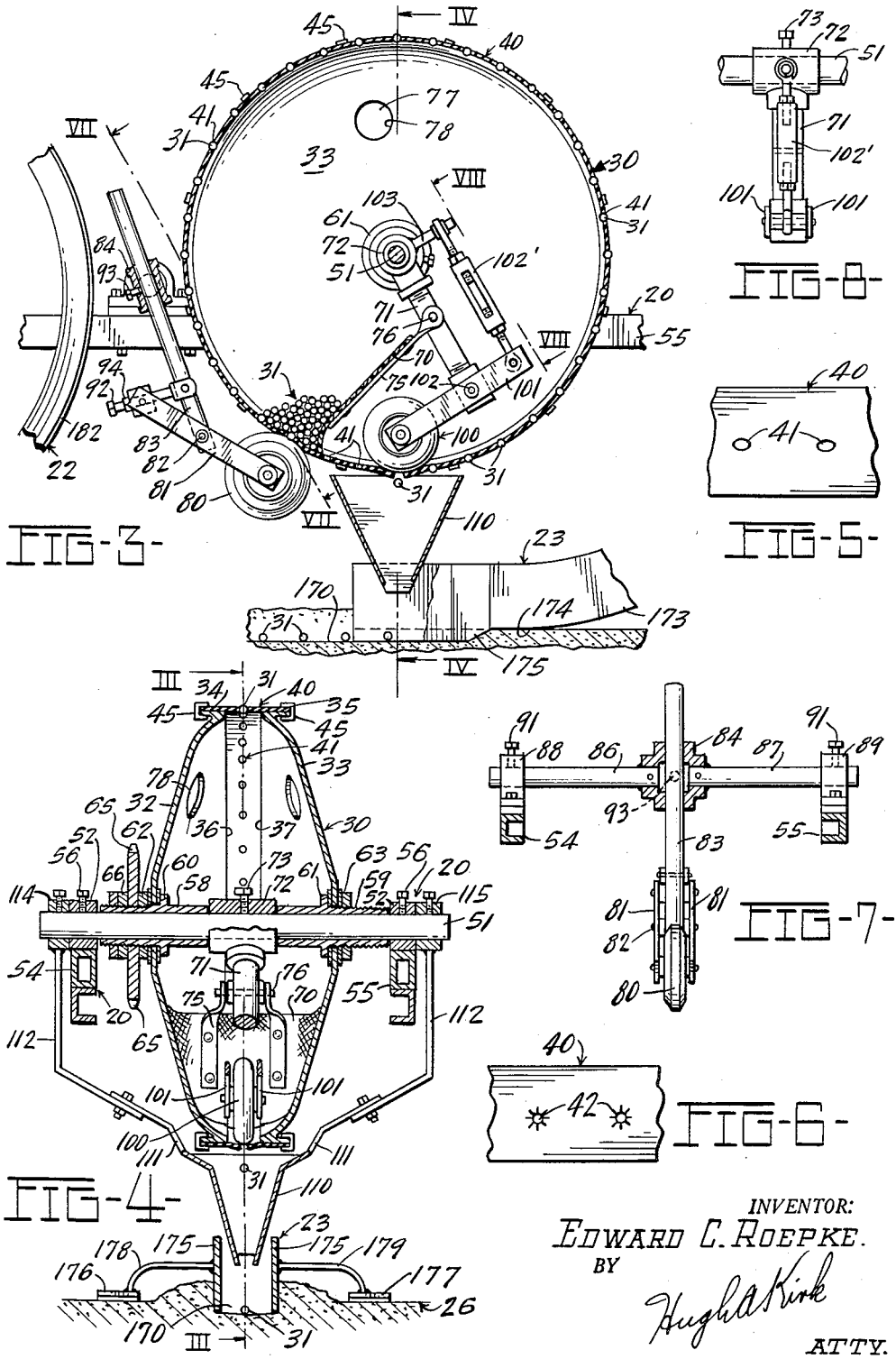

United States Patent Office 3,022,755
Patented Feb. 27, 1962

3,022,755
PARTICLE SELECTING AND DISPENSING DEVICE
Edward C. Roepke, 113 S. Toledo St., Elmore, Ohio
Filed Mar. 2, 1959, Ser. No. 796,467
8 Claims. (Cl. 111—77)

This invention relates to a particle selector and dispenser. More particularly, it deals with an apparatus for selecting and discharging one particle at a time from a batch of substantially relatively uniformly sized particles. For example, such an apparatus may be incorporated in a seeder which selects one seed at a time from a batch thereof, and ejects the selected seeds at regular intervals so that they may be planted at regular spaced distances along a row in a field. Such seeds which are planted in this manner, as distinguished from those which are sown, include sugar beet seeds, cottom seeds, corn, beans and the like. Also the particle selecting and dispensing apparatus of this invention may be adapted for the selection of pills or other frangible or infrangible particles from a batch thereof, to dispense them one at a time, such as for packaging.

Previously, rotating metal disk or drum selectors for seeders often cut, broke or mutilated the seeds, as well as produced grit which made lubrication of the metal parts of such selectors difficult.

Accordingly, it is an object of this invention to produce a simple, efficient, economic, effective, fast, and accurate particle selecting and dispensing mechanism.

Another object is to produce such a particle selecting and dispensing device adapted for selecting seeds from a batch without crushing, mutilating or damaging of the seeds.

Another object is to produce such a device which may be readily adjusted and adapted for different size and shaped particles, as well as be readily adjustable for different rates of sequentially dispensing one particle at a time.

Another object is to provide a seeder vehicle incorporating such a selecting and dispensing device for seeds which may be driven or drawn by a tractor or the like for dropping one seed at a time at predetermined spacings into a furrow, which device may be operated by a drive connection to a wheel of the drawn vehicle upon which the seeder is mounted. Also this seeder vehicle may include means for preparing the ground before the furrow for the seeds is made therein, making the furrow, and then covering up the seeds in the furrow.

Generally speaking, the selecting and dispensing device of this invention comprises a receptacle for the particles to be selected, a stretchably resilient or elastic strip having particle engaging holes or apertures therein, means to move the elastic strip relative to the receptacle, means to flex one side of the strip adjacent the receptacle so as to receive the particles therefrom in the apertures of the strip, and means thereafter to flex the other side of the strip to discharge or to push the particles one at a time from and through the holes in the strip.

In one embodiment of this device, the receptacle for the particles to be selected may comprise a rotatable drum having a partition therein extending radially inwardly from the circumference of the drum, with the circumference of the drum provided with the elastic strip as an elastic band having circumferentially spaced apertures therein, which apertures are smaller than the average size of the particles to be selected thereby. Pressing against the outside of the band of the drum radially inwardly may be provided a means, such as a drag wheel, to stretch the band to open the apertures to receive the particles in the compartment in the drum on one side of the partition. The rotation of the drum agitates the particles so that they may readily fall into the spread apertures as they move past the drag wheel. Then as the band leaves the drag wheel, the particles are held in the apertures by the natural elasticity of the band until they move to another portion of the drum where a second means, such as a second drag wheel, mounted inside the drum, flexes the band outwardly to stretch the apertures one at a time to release the particles engaged in the apertures and/or push them through the apertures into a receiver which may be provided therefor at a given position outside the periphery of the drum. Thus, substantially one particle at a time is picked up by the holes in the elastic band on the drum as it rotates from the batch of particles on one side of the partition in the drum, and then they are dscharged one at a time at another position around the periphery of the drum at time intervals depending upon the spacing of the holes in the band around the drum and the relative speed of rotation of the band.

One application of the device of this invention comprises the selection and dispensing of seeds to be planted wherein the rotating drum with the elastic band is mounted on a vehicle which may be dragged behind a tractor, with one wheel of the vehicle geared to rotate the drum, and chute receiver for seeds discharged from the drum, which chute is directed behind a plow that prepares a furrow for the seeds. In front of the plow and on the same vehicle there may be provided a tiller to prepare the soil for the seed, and preferably behind the plow there may be provided means, such as a bevelled rim press wheel, for covering up the furrow after the seeds have been dropped therein behind the plow.

The above mentioned and other features and objects of this invention and the manner of attaining them will become more apparent and the invention itself will be best understood by reference to the following description of embodiments of the invention taken in conjunction with the accompanying drawings, wherein:

FIG. 1 is a side elevation of a simplified form of seeder vehicle incorporating a rotating drum type of particle selecting and dispensing device according to this invention, and also showing a plow and a following furrow covering wheel;

FIG. 2 is a plan view of a seeder vehicle similar to that shown in FIG. 1, showing a different type and variable speed drive between the following wheel and the rotating drum of the particle selecting and dispensing device, and including a tiller before the plow for preparing the soil for the seeds;

FIG. 3 is an enlarged vertical sectional view (as if taken along line III—III of FIG. 4) of the drum type particle selecting and dispensing device disclosed in the seeders of FIGS. 1 and 2, illustrating the operation of the device;

FIG. 4 is a vertical sectional view taken along line IV—IV of FIG. 2;

FIGS. 5 and 6 are sections of the elastic band provided around the periphery of the drum of FIGS. 3 and 4 showing two different types of apertures which may be provided therein;

FIG. 7 is an enlarged section and view taken along line VII—VII of FIG. 3 showing the drag roller means for flexing the band to receive the seeds from their receptacle in the drum;

FIG. 8 is a view taken along line VIII—VIII in FIG. 3 showing the adjustment mechanism for the means in the drum for flexing the belt to discharge the seeds from the band around the drum;

FIG. 9 is a sectional view taken along line IX—IX of FIG. 1 showing part of the seed receiving funnel and the plow for making the furrow in which the seeds are to be planted; and FIG. 10 is a section taken along line X—X of FIG. 1 of part of the follower furrow covering wheel showing how this wheel covers up the seeds after they have been planted in the furrow made by the plow.

I. INTRODUCTION

For the purpose of illustration, the embodiment of the particle selecting and dispensing device of this invention described herein has been directed to a rotating drum type device adapted to a seeder for selecting seeds, such as prepared single sprout sugar beet seeds, from a batch thereof and planting them at regular equal intervals, say about six inches apart, in a furrow as the seeder which is moved over a field in which the seeds are to be planted. FIGS. 1 and 2 show two embodiments of such a seeder.

In FIG. 1, the seeder vehicle comprises a frame 20 which may be supported by a forward pair of wheels 21, one mounted on each side of the frame, and a single rear follower wheel 22. Adjacent the forward wheels 21 there may be suspended a furrow forming shoe or plow 23, and the forward end of the frame 20 may be provided a hitch 25 for attachment to the drawbar of a tractor, or other means for moving the vehicle of the seeder over the surface of a field 26.

If desired, in front of the plow 23 there also may be provided a drum or wheel type tiller 27, as shown in FIG. 2 instead of or together with the wheels 21 for preparing the soil for the seeds to be planted therein, before the furrow is made by the plow 23.

Above the plow 23 and between it and the follower wheel 22, there is shown the rotating drum type of the particle selecting and dispensing device 30 of this invention, which may be rotated by a gearing connection with the follower wheel 22 as will be described later. If desired, without departing from the scope of this invention, a plurality of similar seeders may be incorporated parallel to each other in a common vehicle for planting a plurality of rows at the same time.

Before further describing the seeder vehicle, the details of the particle selecting and dispensing device itself will be described in connection with FIGS. 3 to 8 on the second sheet of the drawings, in that this selector may also be employed in other devices than seeders.

II. PARTICLE SELECTOR AND DISPENSER

(a) Batch Particle Receptacle and Elastic Band

Referring now to FIGS. 3 and 4, there is disclosed one embodiment of the receptacle for the batch of particles 31, such as seeds to be planted, which may comprise a pair of rigid disks 32 and 33, which may have outwardly extending peripheral flanges 34 and 35, respectively (see FIG. 4), which disks form the circular ends of a drum and have their inner flanged edges 36 and 37, respectively, spaced from each other. This space is bridged by a circumferential resilient or elastic strip or band 40 provided with a peripheral medial row of apertures 41 (or 42 as shown in FIG. 6), which apertures are smaller in diameter by about 50% of the average size of the seed or particle to be selected thereby and held therein. These apertures may be either elliptical or oblong as apertures 41 shown in FIG. 5 or circular as shown in FIG. 6, and/or they may comprise two or more radial slits shown around the apertures 42 shown in FIG. 6 to increase their flexibility for the ready reception and discharge of the particles to be held therein, when the band 40 is flexed to stretch and open the apertures for the reception or release of the particles, as will be described later. This band 40 may be readily replaced by other bands with different spacings of the apertures and/or different shapes and sizes of apertures or holes, by removing clamps 45 which may be provided at intervals around its periphery. These clamps may be resilient U-shaped springs or screw clamps, as desired, to clamp the edge of the band 40 with the outwardly extending flanges 34 and 35 of the end disk members 32 and 33 of the drum 30. Instead of these clamps, peripheral retaining strips 46 (see FIG. 2) may be employed for continuously clamping the edges of the band 40 to the flanged edges of the disks 32 and 33, however, in this embodiment, the flanges 34 and 35 on the edges of the disks 32 and 33 need not extend outwardly, as shown in FIG. 4, but may extend inwardly as rims of cup-shaped disks or dishes 32 and 33.

The horizontal axis of the drum which herein is located transverse of the direction of movement of the vehicle frame 20, may be mounted on a shaft 51 which may be adjustably attached by brackets 52 to the members 54 and 55 of the frame 20. This shaft 51 herein is shown to be anchored to the brackets 52 by set screws or bolts 56, and the centers of the disks 32 and 33 may be anchored to sleeve bearing members 58 and 59 which rotate on the fixed shaft 51. These sleeve members 58 and 59 may be partially externally threaded and provided with shoulders 60 and 61, respectively, so that ring nuts 62 and 63 may clamp the edges of the central holes in the drum end disks 32 and 33 respectively, against said shoulders 60 and 61. On at least one of the sleeves 58, outside of the drum 30, there also may be clamped a driving gear, such as sprocket 65 shown in FIGS. 1 and 4, which similarly may be clamped by additional ring nuts 66 to the sleeve 58 so as to rotate the drum 30 as a unit.

Between the sleeves 58 and 59 inside the drum there preferably is anchored against rotation with the drum to the center of the fixed shaft 51, a radially extending partition 70 by means of a radially extending arm 71 anchored to a sleeve 72 fixed to the shaft 51 by means of a set screw or bolt 73. This partition 70 may be formed of a rigid plate with flexible edges or of a flexible material reinforced with supporting strips 75 that anchor it by means of a bolt 76 to the arm 71, with its edges wiping against the inside surfaces of the end disks 32 and 33 of the drum as well as that of the peripheral band 40, to prevent any of the particles 31 from passing around the edges of the partition 70 as the drum rotates, thereby confining the batch of particles 31 to one side of the partition 70 and preventing them from interfering with the dispensing part of the mechanism, which may also be mounted on the arm 71 as will be described later. The seeds 31 may be introduced into the drum 30 into the hopper portion thereof formed by the partition 70, through a removable cover 77 on an opening 78 which may be provided in the disk 32 or 33.

(b) The Selector

Cooperating with the outside of the drum 30 and pressing against and inwardly flexing the outside of the peripheral elastic band 40 adjacent the lower portion of the hopper in the drum provided by the partition 70 for the particles 31, there may be pressed a means such as the drag wheel 80 (see FIGS. 3 and 7). This flexing wheel 80 may be mounted on an adjustable bracket comprising a forked arm 81 pivoted at 82 to the lower end of a rod 83 which is axially and rotatably adjustable in a T-shaped apertured fitting 84 mounted on a pair of horizontally aligned stub shafts 86 and 87, which shafts may be journalled on adjustable brackets 88 and 89 attached to the frame members 54 and 55 of the frame 20 on the side of the drum 30 adjacent the hopper of particles 31. Set screws or bolts 91 in the brackets 88 and 89 may adjust the angular location of the support for the drag wheel 80, as well as the adjustable nut-locked bolt 92 connected between the opposite end of the forked level 81 from the drag wheel 80 and the rod 83. The lock nut 93 (see FIG. 3) anchors the rod 83 in the desired extended or retracted position from the fitting 84, and then by adjusting the nut 92 and its lock nut 94, the amount of band flexing pressure of the drag wheel 80 against the outside of the strip or band 40 along the peripheral line of the apertures 41 or 42 may be regulated, so that the drag wheel 80 pushes against the apertures 41 or 42 to stretch them open sufficiently to receive one, and preferably only one, of the particles or seeds from the batch 31. Then as the drum rotates with its elastic band 40 away from the drag wheel 80, the natural elasticity of the band 40 will grab the particle 31 in its aperture 41 or 42 and carry the particle 31 around and over the top of the drum until it is discharged by a similar wheel or discharge flexing means 100 on the inside of the drum, as will be described below.

The shape of this roller or wheel 80 should be such to press adjacent each aperture 41 or 42 to open it for the easy reception of the particles 31 as they are tumbled and continuously moved in the hopper portion of the drum 30 by the rotation of the drum, but not to open them so much that more than one seed may be grabbed by any one aperture. However, in view of the fact that particles such as seeds vary in diameter considerably, there always is the possibility that two very small seeds may be engaged at one time in one aperture, but actually this is very rare, so that a substantial unitary selection of one seed at a time from the batch 31 is practically insured by this particular apparatus. The cross-sectional contour of the pressing surface of the drag wheel 80 may be trapezoidal or round to spread the apertures 41 or 42, respectively, or vice versa, and its pressing surface may be composed of a hard rubber or plastic material to avoid excessive wear of the band 40.

The belt 40 on the drum 30 may be composed of gum rubber, natural or synthetic, or even sponge rubber, and preferably for seeds is about ¼" thick, with the holes therein spaced at least 1" apart. The spacing of the holes, however, depends upon the diameter of the flexing means or wheels 80 and 100, and the wheel 80 may be of a greater diameter than the discharging wheel 100, in that it is not so important that only one particle is selected in only one aperture at a time as it is that one particle 31 is ejected at a time. Thus, the ejector wheel 100, may be about 3" in diameter, while that of the selector wheel 80 outside the drum 30 may be about 4½" in diameter, based upon a drum 30 having a diameter of about 18" and a band hole spacing of 1". Larger batches may be inserted in a drum of greater diameter, without departing from the scope of this invention. An important advantage of the elastic band 40 is that it can be made sufficiently flexible so as to prevent mutilation of frangible particles, such as seeds and thus avoids the mechanical hazard of breaking the seeds in the metal type disk or drum selectors previously employed in seeders. Furthermore, there is no breaking off of parts of the seed to jam any of the mechanism or hinder in the lubrication of the selecting device.

(c) The Dispenser and Receiver

Referring now to FIGS. 3, 4 and 8; at the end of the radially extending rod 71 from the rigid sleeve 72 on the shaft 51 in the drum 30, there may be pivoted a bifurcated bracket 101 for the support of the ejecting or dispenser drag roller or wheel 100, which bracket may be pivoted intermediate its ends at 102 to the outer end of the rod 71. At the end of the bracket 101 opposite from the drag wheel 100, there may be provided a turnbuckle type of adjustment means 102', connected between it and a lug 103 mounted on the sleeve 72. Thus, the outward radial pressure of the roller 100 against the inside of the belt 40 adjacent the row of apertures 41 or 42 may be regulated to insure sufficient outward flexing of the band and/or stretching of the apertures to release the particles 31 therefrom into a suitable receiver or funnel 110.

This receiver 110 may be supported on brackets 111 and 112 (see FIG. 4) connected to the opposite sides of the funnel 110, and thence by fittings 114 and 115 attached to the brackets 112, which fittings may be and herein are shown to be fastened to the outer ends of the fixed shaft 51. The receiver 110 directs or feeds the particular seeds 31 to the place where they are to be employed, which in this particular instance is to a place just behind the plow 23, for the proper dropping of the seeds in a furrow provided by the plow for their uniform planting.

(d) The Driving Mechanism

Referring back to FIGS. 1 and 2, the means for rotating the drum 30 may be by means of a sprocket chain 125 as shown in FIG. 1, for driving the sprocket wheel 65, which chain may be connected to a, preferably smaller, sprocket wheel 126 mounted on the shaft 131 for the follower press wheel 22. This shaft 131 rotates in bearings 132 and 133 which may be adjustable on the members 54 and 55 of the frame 20 of the vehicle. Keyed to the center of the shaft 131 is the follower wheel 22 which is rotated as the vehicle 20 is moved over the field 26. Thus, by reducing the speed of rotation of the drum 30 with respect to that of the wheel 22, a comparatively close spacing of the apertures 41 in the band 40 may be employed so that the seeds 31 will be ejected and dropped into the furrow formed by the plow 23 at a distance of every six or eight inches as desired. This distance may be changed by changing the size of the sprocket wheel 65 with respect to that of the sprocket wheel 126, to meet with any desired planting spacing.

Another embodiment of means for varying the drive without interchanging the sprocket wheels, is disclosed in FIG. 2 and is similar to that disclosed in U.S. Patent No. 2,668,638, issued February 9, 1954, to R. L. Joy, wherein there is provided, instead of the sprocket wheels 65 and 126, a bevelled gear 141 mounted on the shaft 131, which drives a square shaft 142 supported by bearings 143 and 144 mounted on the frame member 54. Slidably mounted on this shaft 142 is a spur gear 145 connected to a square sleeve 146 having a radially urged pin 147 which may be fitted into any one of a series of holes 148 along the shaft 142 corresponding to the engagement of the spur 145 with each one of a plurality of concentric face ring gears 155 attached to the sleeve 56, in place of the sprocket gear 65 shown in FIG. 4. Thus by longitudinally adjusting the spur gear 145 and its sleeve 146 along the shaft 142 into mesh with different diameter ring gears 155, different speeds for the rotation of the drum 30 are obtained with respect to the speed of the wheel 22 and the seeder vehicle, to give different spacings for the dropping of the seed particles 31 into the furrow behind the plow 23.

III. THE SEEDER

(a) The Tiller

In the adaptation of the particle selector and dispenser of this invention for a seeder vehicle as shown in FIG. 2, the tiller 27 is shown to comprise a drum 160 mounted for rotation on a shaft 161 journalled in bearings 162 and 163 mounted on the members 54 and 55 of the frame 20, which drum 160 has mounted on its cylindrical surface radially outwardly extending knives 164, which not only work the soil or ground 26 but also chop up any husks or stalks therein or on, while the cylindrical surface of the drum 160 prevents the soil from being agitated too much to produce a good furrow 170 by the plow 23 which immediately follows the tiller.

(b) The Plow

The plow 23 may be mounted to drag on a pivot 171 attached to a cross member 172 that may be adjustably anchored to the members 54 and 55 of the frame 20. This plow 23 may comprise a downwardly and rearwardly extending arcuate member 173, the bottom edge 174 of which, just before being attached to the V-shaped plow member 175, may act as a guide to prevent the plow from entering too far into the soil and making too deep a furrow for the particular type of seeds which are to be planted. The V-shaped plow member 175 herein extends below the surface 174 about ¾" to 1", which is the depth for planting sugar beet seeds, and thus produces the furrow 170 of this depth for seeds which are dropped from the funnel 110 between the sides of the V-shaped plow 175. On opposite sides of the bifurcated or V portion of the plow 175, there also may be attached and spaced therefrom, a pair of shoes 176 and 177 (see FIG. 4) which may be mounted on arms 178 and 179 attached to said plow sides, which shoes may be adjusted to ride over the surface of the soil 26 and prevent the plow from digging too deep a furrow 170. The arms 178 and 179 bridge the dirt which is dug up by the plow so that this dirt will not affect the depth of the furrow dug by the plow.

(c) The Furrow Covering Means

Behind the plow on the frame 20 of the seeder vehicle may be a following press wheel 22 as shown in FIGS. 1, 2 and 10, for covering the seeds 31 in the furrow 170 by pressing the ridges of dirt pushed up by the plow on each side of the furrow, back into the furrow by the inwardly bevelled rims 182 and 183 of the follower wheel 22. The rims 182 and 183 of the follower wheel 22 may be covered or replaced by a pneumatic tired wheel for performing the same function, and having the advantage that wet dirt does not stick so readily to it.

Thus, the planting has been completed by a single seeder which incorporates the seed selector and dispenser of this invention.

IV. CONCLUSION

It is to be clearly understood that interchanging of the parts of the seeders and the selector mechanisms disclosed in the different embodiments thereof may be made without departing from the scope of this invention. Also the rotating drum 30 with its elastic band 40, drag wheels 80 and 100 may be employed in other devices than seeders for the selecting of delicate particles which would be damaged by other mechanical and/or metal selecting devices now known on the market. Furthermore, the selector device of this invention also may be employed in the planter for corn and cotton, however, the shape, size and/or configuration of the holes 41 or 42 in the band 40 may have to be changed from those shown herein. If cotton seeds are employed, they preferably should be treated with acid to remove the fuzz and sticky portions thereof so they will not stick together and will easily tumble in the drum 30 and fall into the apertures or holes 41 and 42 when they are opened by the selector drag wheel 80. If more than one particle or seed is to be planted at one place in a furrow, a plurality of wheels or transverse rows of holes in a band 40 may be provided so that a given plurality of seeds may be deposited in a common funnel, chute or receiver 110 simultaneously. Thus, two, three, four or more seeds may be deposited at regular intervals from corresponding rows of holes in one or more adjacent drums, through which the discharge or receivers therefrom are funnelled together to a common furrow.

While there is described above the principles of this invention in connection with specific apparatus, it is to be clearly understood that this description is made only by way of example and not as a limitation to the scope of this invention.

What is claimed is:
1. A particle pick-up and discharging device, comprising:
(A) a support,
(B) a shaft mounted on said support,
(C) a hollow rotatable drum providing a reservoir for a plurality of said particles, said drum having:
 1. a circumferential band of elastic material with spaced circumferentially aligned apertures therein normally smaller than the particles to be held in said apertures,
(D) means adapted to be connected to said drum to rotate said drum on said shaft,
(E) a first means adapted to be connected to said support outside said drum to flex said band inwardly to increase the size of said apertures so that each aperture successively engages at least one of said particles, and
(F) a second means adapted to be connected to said shaft in said drum to flex said band outwardly to eject said particles from said apertures successively outside of said drum after said drum has rotated away from said first flexing means.

2. A device according to claim 1 wherein said elastic band contains radial slits around the edges of said apertures to increase the flexibility of changing the size of said aperture by said flexing means.

3. A device according to claim 1 including a stationary partition means in said drum adapted to be connected to said shaft and extending outwardly to the peripheral wall of said drum to maintain said plurality of particles in said drum on one side of said partition and away from said second flexing means.

4. A device according to claim 1 wherein said drum comprises a pair of peripherally flanged disks axially spaced on said shaft and wherein said elastic band is connected to the flanges of said disks and bridge the space between said disks to form the peripheral wall of said drum.

5. A device according to claim 1 including a closable port in said drum for introducing particles into said drum.

6. A device according to claim 1 wherein said first and second flexing means comprise drag wheels pressing against the outside and inside of said elastic band, respectively, rolling along the line of said apertures.

7. A device according to claim 1 including means between each of said flexing means and said support for adjustably varying the pressure of each of said flexing means against said elastic band.

8. A device according to claim 1 wherein said support comprises a planter vehicle having mounted thereon a furrow opener, a means for receiving ejected particles from said drum and for introducing said ejected particles into said furrow, and a furrow closer.

References Cited in the file of this patent

UNITED STATES PATENTS

| | | |
|---|---|---|
| 883,563 | Parrish | Mar. 31, 1908 |
| 1,006,984 | Sheetz | Oct. 24, 1911 |
| 2,670,584 | Rood | Mar. 2, 1954 |
| 2,931,325 | Thelander | Apr. 5, 1960 |

FOREIGN PATENTS

| | | |
|---|---|---|
| 500,972 | Belgium | Feb. 15, 1951 |
| 501,337 | Belgium | Mar. 15, 1951 |
| 1,094,914 | France | Dec. 15, 1954 |
| 403,144 | Germany | Sept. 23, 1924 |
| 255,257 | Italy | Oct. 14, 1927 |